United States Patent

Ito

(10) Patent No.: US 10,667,085 B2
(45) Date of Patent: May 26, 2020

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Morikazu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/227,163

(22) Filed: Dec. 20, 2018

(65) Prior Publication Data

US 2019/0215651 A1 Jul. 11, 2019

(30) Foreign Application Priority Data

Jan. 5, 2018 (JP) ................................. 2018-000770

(51) Int. Cl.
*H04W 4/02* (2018.01)
*H04W 4/80* (2018.01)

(52) U.S. Cl.
CPC .............. *H04W 4/023* (2013.01); *H04W 4/80* (2018.02)

(58) Field of Classification Search
CPC ....... H04W 84/12; H04W 4/80; H04W 4/029; H04W 4/025; Y02D 70/142; Y02D 70/00; Y02D 70/144; H04L 67/18; H04L 65/403; H04L 67/12; H04L 41/0813; H04L 67/42

See application file for complete search history.

(56) References Cited

U.S. PATENT DOCUMENTS

| | | | |
|---|---|---|---|
| 6,453,071 B2 | 9/2002 | Ito et al. | |
| 6,477,319 B1 | 11/2002 | Ito et al. | |
| 6,683,999 B2 | 1/2004 | Ito et al. | |
| 2005/0060046 A1 | 3/2005 | Ito et al. | |
| 2007/0002811 A1* | 1/2007 | Faccin | H04W 48/08 370/338 |
| 2010/0240320 A1* | 9/2010 | Kohno | H04L 1/0014 455/68 |
| 2015/0349917 A1* | 12/2015 | Skaaksrud | H04B 17/3913 370/328 |

(Continued)

FOREIGN PATENT DOCUMENTS

JP 2012-173070 A 10/2012

*Primary Examiner* — Dung Hong
(74) *Attorney, Agent, or Firm* — Venable LLP

(57) ABSTRACT

An information processing apparatus communicates receives wirelessly and directly, from a device, advertising packets of a plurality of different formats that comply with a predetermined communication standard and are transmitted from the device, and estimates a proximity level between the device having transmitted the advertising packets and the information processing apparatus by sampling the radio field intensities of the advertising packets of the plurality of different formats. The advertising packets include a first advertising packet of a first format and a second advertising packet of a second format, wherein a number of sampling of the radio field intensities of the first advertising packet is less than that of the radio field intensities of the second advertising packet per unit of time. A sampled radio field intensity of the first advertising packet influences the estimate more than a sampled radio field intensity of the second advertising packet.

20 Claims, 12 Drawing Sheets

(56) References Cited

U.S. PATENT DOCUMENTS

| | | | |
|---|---|---|---|
| 2015/0351018 A1* | 12/2015 | Kim | H04W 48/16 |
| | | | 370/338 |
| 2015/0378296 A1* | 12/2015 | Kim | G03G 15/5091 |
| | | | 399/80 |
| 2016/0026837 A1* | 1/2016 | Good | G16Z 99/00 |
| | | | 340/539.13 |
| 2016/0050526 A1* | 2/2016 | Liu | H04W 4/021 |
| | | | 455/457 |
| 2016/0066123 A1* | 3/2016 | Ko | H04B 17/318 |
| | | | 455/41.1 |
| 2017/0134606 A1* | 5/2017 | Kim | H04N 1/00106 |
| 2017/0192083 A1* | 7/2017 | Avitzour | G01S 5/0215 |
| 2017/0276776 A1 | 9/2017 | Ito | |
| 2018/0060005 A1* | 3/2018 | Ueno | G06F 3/121 |
| 2018/0084485 A1* | 3/2018 | Hariharan | H04W 8/005 |
| 2018/0128861 A1* | 5/2018 | Jang | A61B 5/1455 |
| 2018/0152589 A1* | 5/2018 | Matsuda | H04N 1/32112 |

* cited by examiner

FIG. 4

| DISTANCE | RADIO FIELD INTENSITY |
|---|---|
| 10m | 90dbm |
| 5m | 80dbm |
| 3m | 70dbm |
| 1m | 60dbm |
| 50cm | 50dbm |
| 30cm | 40dbm |
| 10cm | 30dbm |

FIG. 5A

Peripheral

| UUID | xxxxxxxx-xxxx-xxxx-xxxx-xxxxxxxxxxxx |
|---|---|

Advertise

| Format | Mobile app beacon |
|---|---|
| DeviceName | Printer A |
| other | VARIOUS PIECES OF INFORMATION |
| ... | ... |

FIG. 5B

Peripheral

| UUID | xxxxxxxx-xxxx-xxxx-xxxx-xxxxxxxxxxxx |
|---|---|

Advertise

| Format | iBeacon for print |
|---|---|
| other | VARIOUS PIECES OF INFORMATION |
| ... | ... |
| ... | ... |

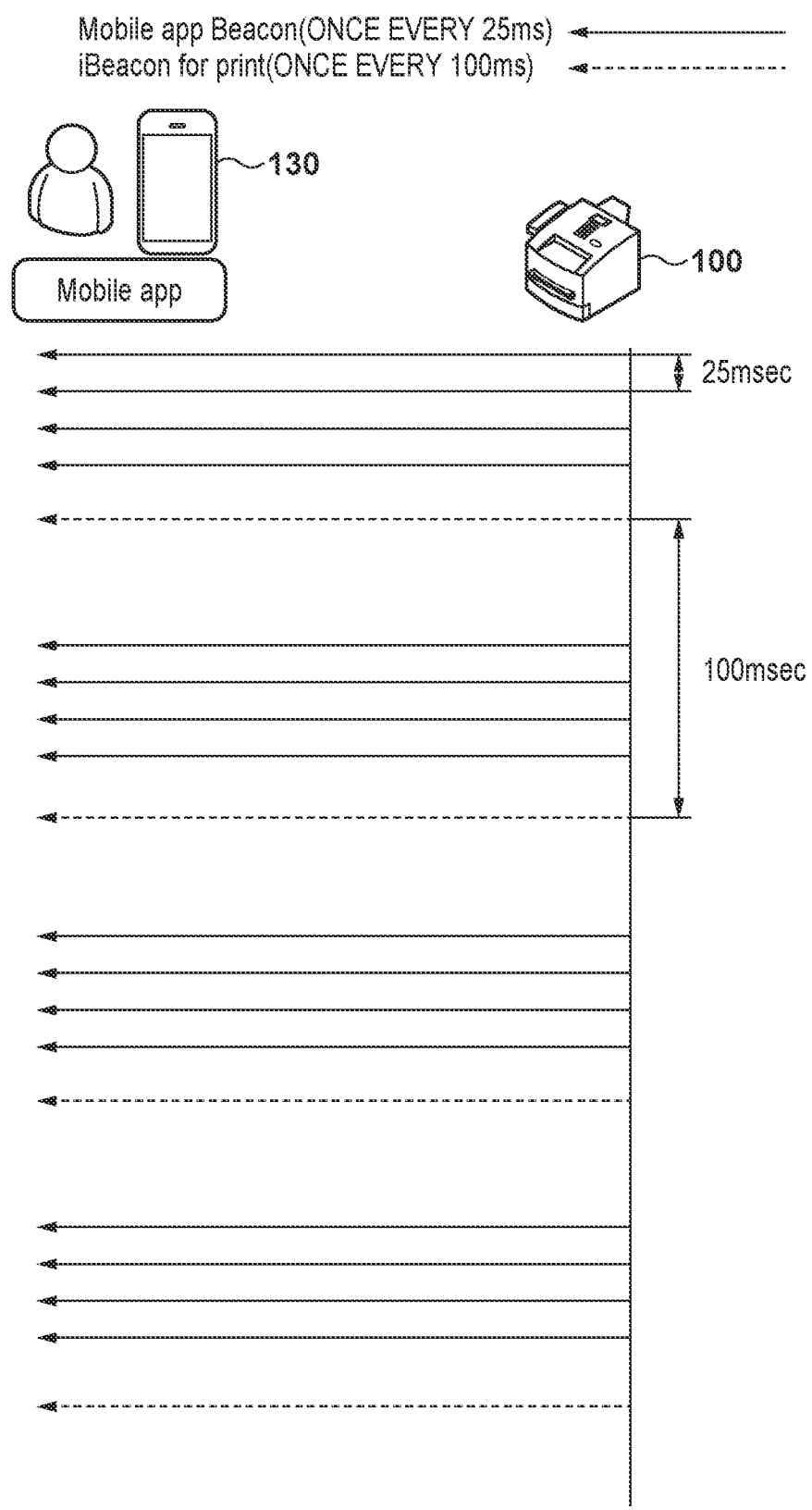

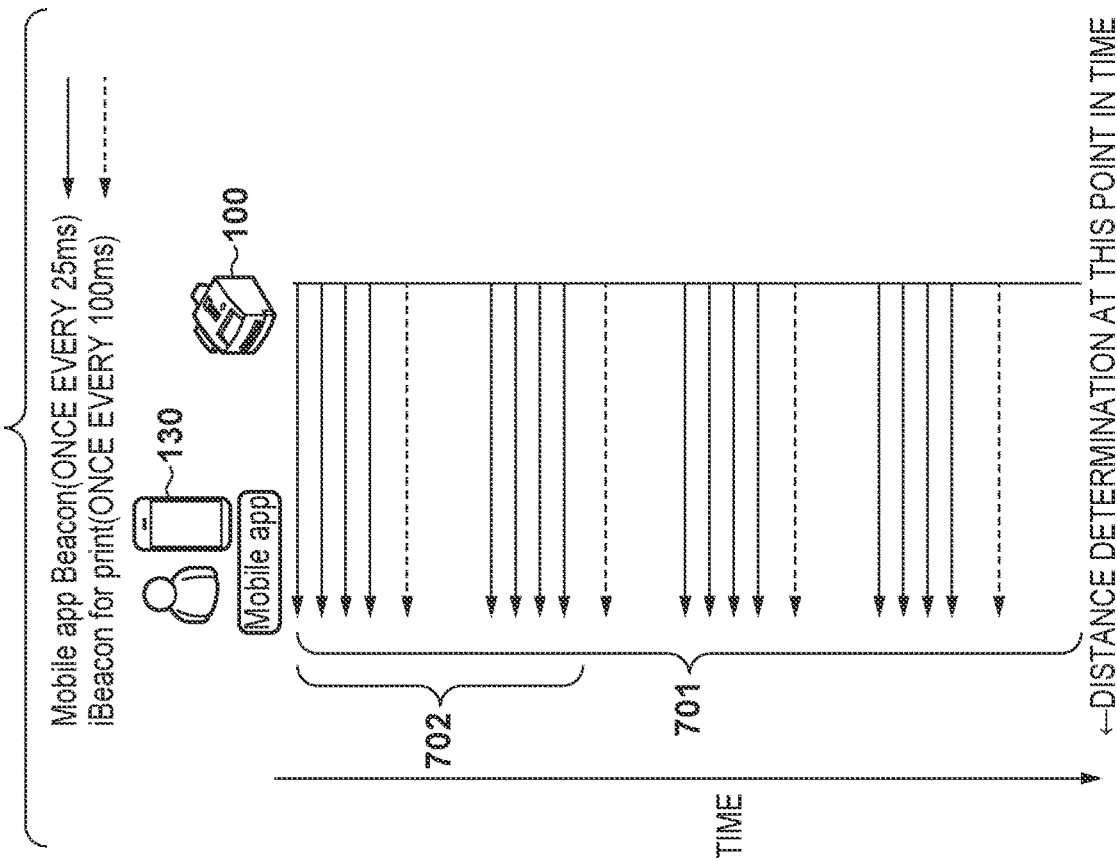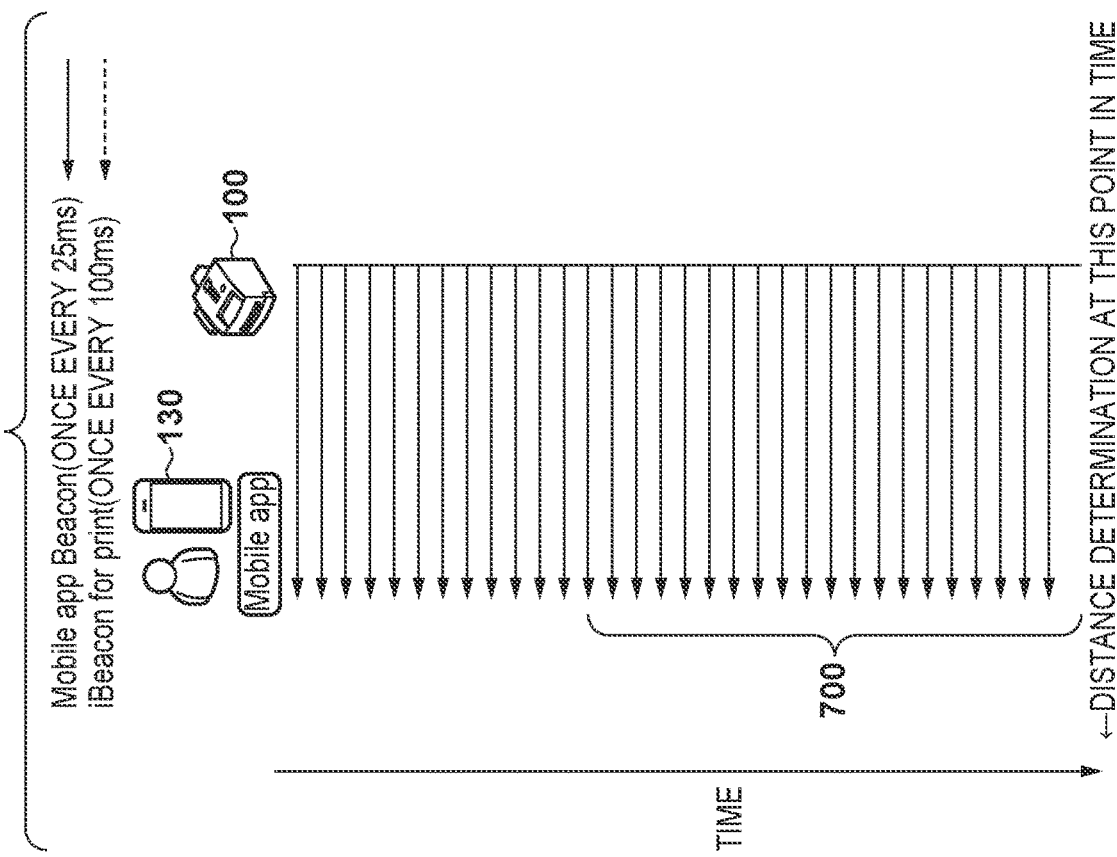

FIG. 10

| beacon TYPE | RADIO SIGNAL EMISSION INTERVAL | WEIGHT |
|---|---|---|
| Mobile app beacon | 25msec | 1 |
| iBeacon for print | 100msec | 4 |
| xxx-beacon | 50msec | 2 |
| yyy-beacon | 200msec | 8 |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

Image forming apparatuses, such as a multi-function peripheral or a printer, provided with a wireless function such as a wireless LAN or Bluetooth (registered trademark) Low Energy (Bluetooth LE) are increasing in number. A user uses the Bluetooth LE function to perform the wireless communication between a mobile terminal and the image forming apparatus, and, after performing pairing of the mobile terminal and the image forming apparatus based on information contained in communication information, performs various processing. Because a radio field intensity in the wireless communication in such a case typically has a characteristic of attenuating in inverse proportion to the square of distance, it is possible to obtain the distance between the mobile terminal and the image forming apparatus based on the radio field intensity received by the mobile terminal.

As prior art for measuring the distance between an image forming apparatus and a mobile terminal, for example, in Japanese Patent Laid-Open No. 2012-173070, a signal transmitted from an access point is received, an RSSI is calculated, and a radio environment index is calculated from the RSSI. Japanese Patent Laid-Open No. 2012-173070 discloses a technique for estimating the position of respective mobile terminals by calculating this index for each access point and giving a weighting to each access point when identifying the position.

In addition, for a Bluetooth LE wireless radio wave, respective companies define their own proprietary formats. For example, Apple Inc. has defined iBeacon (registered trademark), and Google Inc. has defined Eddystone (registered trademark).

Incidentally, in a mobile terminal, identifying the distance between an image forming apparatus and the mobile terminal based on the radio field intensity of a Bluetooth LE packet emitted by the image forming apparatus has been considered. For example, performing control such as requesting the image forming apparatus for predetermined processing in accordance with the distance being a fixed value or less can be considered.

Incidentally, the number of Bluetooth LE radio signals that a mobile terminal receives from an image forming apparatus is not limited to one. For example, because one image forming apparatus supports a plurality of formats, time-divisionally outputting radio signals for a plurality of formats can be considered. In such a case, when distance is to be measured using a radio signal of only a predetermined format, the radio signal of the predetermined format cannot be obtained while the image forming apparatus is outputting a radio signal of another format, and thus the accuracy of the measurement may decrease.

SUMMARY OF THE INVENTION

An aspect of the present invention is to eliminate the above-mentioned problem with conventional technology.

The feature of the present invention is to provide a technique that, even in a case where radio signals of a plurality of formats are received, enables estimation of distance with sensitivity similar to that in the case of a single format.

According to a first aspect of the present invention, there is provided an information processing apparatus operable to perform communication in accordance with a predetermined communication standard, the information processing apparatus comprising: a memory device that stores a program; and at least one processor that executes the program stored in the memory to: receive wirelessly and directly, from a device, advertising packets of a plurality of different formats that comply with the predetermined communication standard and are transmitted from the device; and estimate a proximity level between the device having transmitted the advertising packets and the information processing apparatus, wherein, in the estimation, the at least one processor uses radio field intensities of the received advertising packets of the plurality of different formats to estimate the proximity level.

According to a second aspect of the present invention, there is provided a method of controlling an information processing apparatus operable to perform communication in accordance with a predetermined communication standard, the method comprising: receiving wirelessly and directly, from a device, advertising packets of a plurality of different formats that comply with the predetermined communication standard and are transmitted from the device; and estimating a proximity level between the device having transmitted the advertising packets and the information processing apparatus, wherein in the estimating, the proximity level is estimated using radio field intensities of the received advertising packets of the plurality of different formats.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a view illustrating an example of a table held by the mobile terminal for the estimation of distance between the mobile terminal and the image forming apparatus in the first embodiment.

FIGS. 5A and 5B depict views for describing an example of Bluetooth LE advertising packets emitted from the image forming apparatus according to the first embodiment.

FIG. 6 depicts a view for describing an example in which radio signals of a plurality of formats that are emitted from the image forming apparatus according to the first embodiment are time-divisionally emitted.

FIGS. 7A and 7B depict views illustrating an example where, in a case where radio signals of a plurality of formats are used for distance detection and a radio signal emission time interval differs in accordance with the format, the sensitivity drops in comparison to distance detection with only radio signals of a single format.

FIG. 8 is a flowchart for describing processing in which a mobile terminal according to first through third embodiments measures a distance to an image forming apparatus, and acts in accordance with the measured distance.

FIG. 10 depicts a view that illustrating an example of weightings added in step S908 of FIG. 9.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
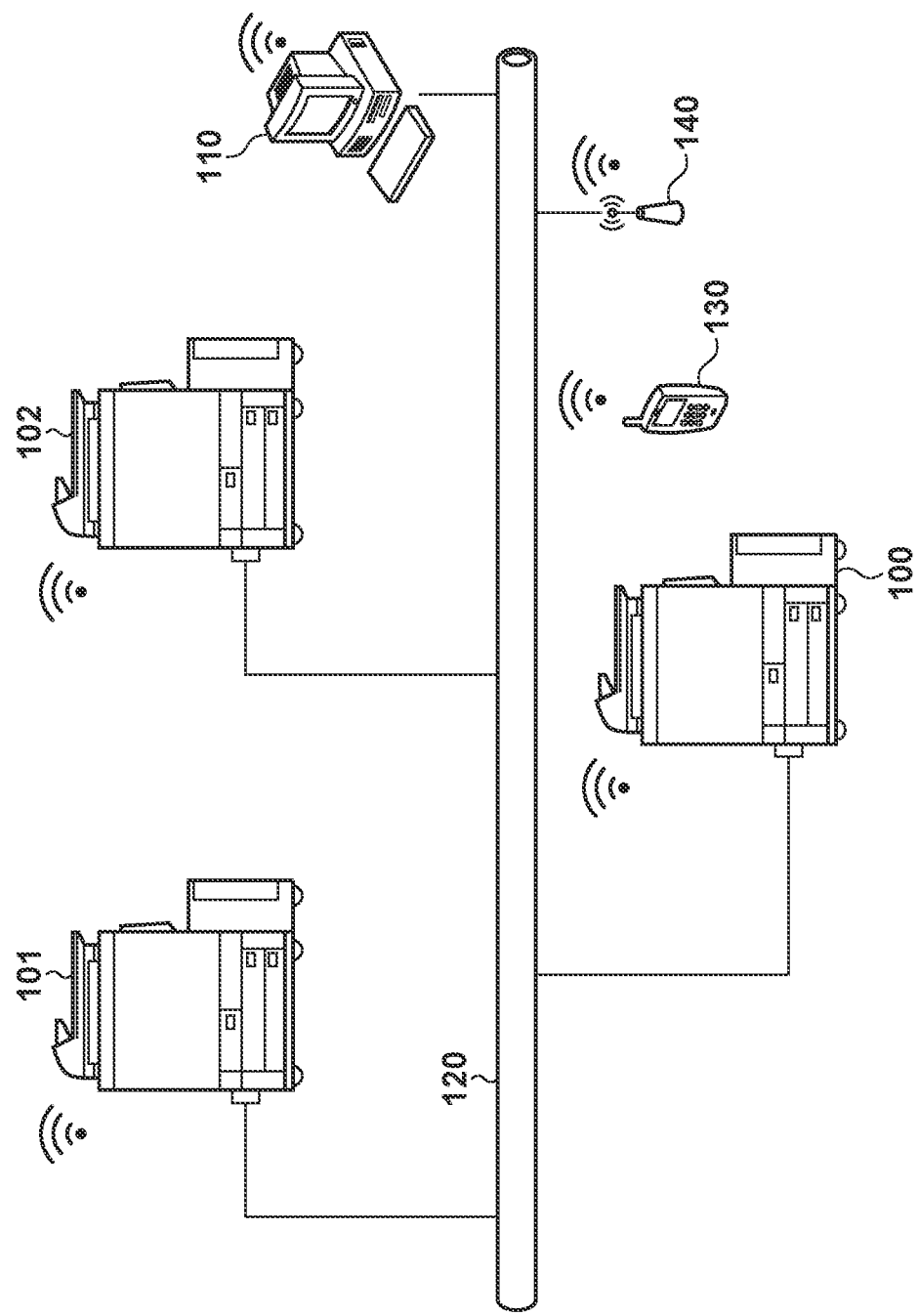
FIG. 1 depicts a view for describing a configuration of a communication system according to a first embodiment.

FIG. 1 depicts a view for describing a configuration of a communication system according to the first embodiment.

This system contains image forming apparatuses 100 through 102, a PC 110, a mobile terminal 130, and an access point 140 that are connected via a network 120. The image forming apparatuses 100 through 102 can communicate with an external apparatus such as the PC 110 or the mobile terminal 130 via the network 120. In addition, each of the image forming apparatuses 100 through 102 is provided with a wireless function, and transmits or receives wireless LAN or Bluetooth (registered trademark) radio signals. Note that, in the present embodiment, the mobile terminal 130 is exemplified as an example of an information processing apparatus that communicates with an image forming apparatus, but there is no limitation to this. For example, there may be an information processing apparatus such as a tablet terminal, a notebook PC, or a wearable device.

The PC 110 can transmit print data via the network 120 to one of the image forming apparatuses 100 through 102 to cause it to print the print data. The mobile terminal 130 can, via the access point 140, transmit print data to one of the image forming apparatuses 100 through 102 to cause it to print the print data. In addition, the mobile terminal 130 can directly make a wireless connection with one of the image forming apparatuses 100, 101, and 102 without going through the access point 140, and transmit print data to the image forming apparatus that it wirelessly connected to cause this image forming apparatus to print the print data. In addition, the mobile terminal 130 can receive radio signals transmitted from the image forming apparatuses 100 through 102, analyze the details of these radio signals, and perform various processing. The image forming apparatuses 100 through 102, upon receiving print data, execute print processing based on the received print data. In the description below, description relating to the image forming apparatuses 100 through 102 is described as being by the image forming apparatus 100 for simplicity, and cases for the other image forming apparatuses 101 and 102 are similar.

Figure 2:
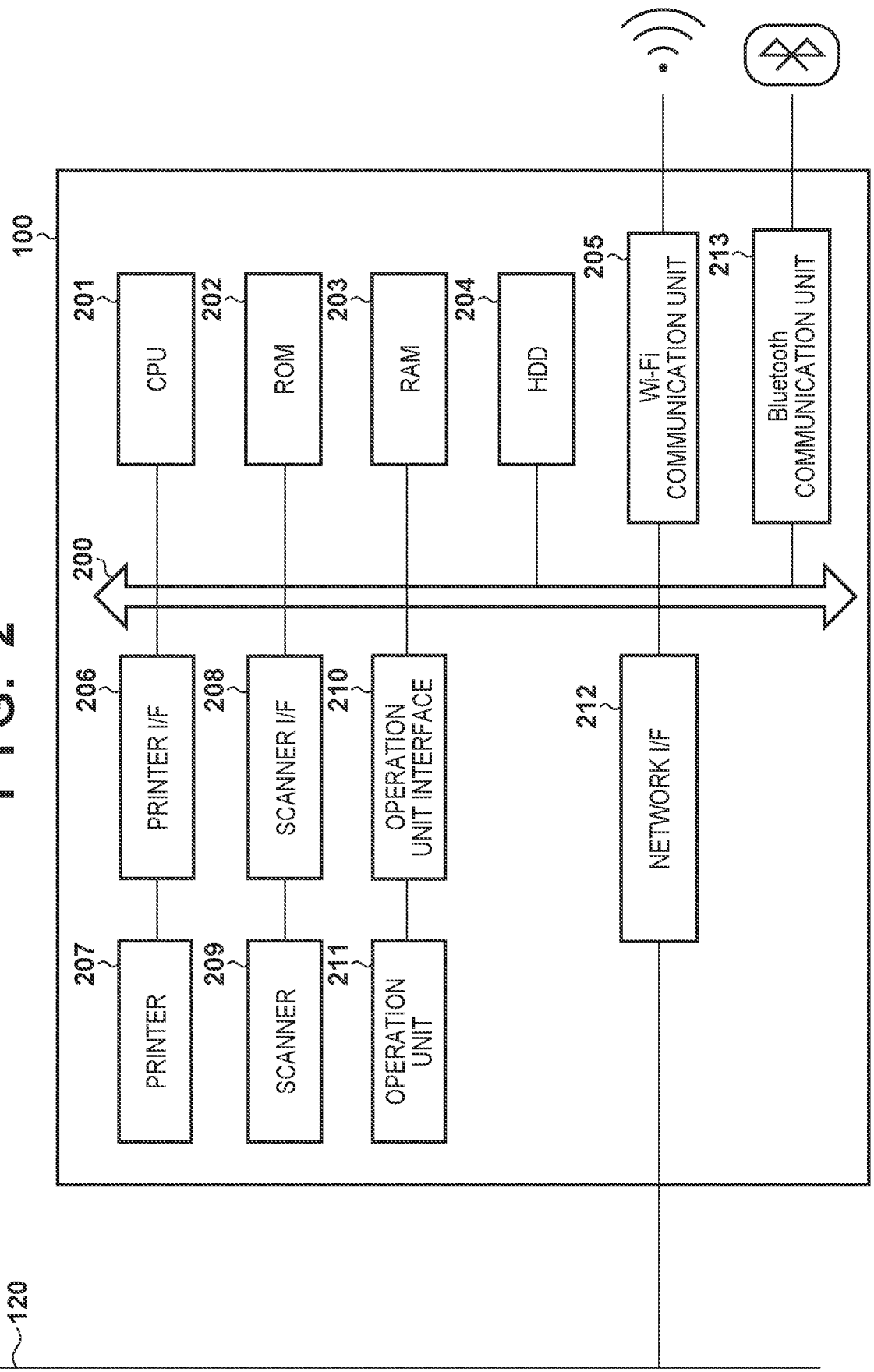
FIG. 2 is a block diagram for describing a hardware configuration of an image forming apparatus of the first embodiment.

FIG. 2 is a block diagram for describing a hardware configuration of the image forming apparatus 100 in the first embodiment. Note that, while it is envisioned that the image forming apparatus 100 according to the first embodiment is a multi-function peripheral, it may be a printer that is not equipped with a scanner function. Also, because the hardware configurations of the other image forming apparatuses 101 and 102 are similar, description thereof is omitted.

A CPU (Central Processing Unit) 201 executes various processing for controlling operation of the image forming apparatus 100 by deploying a control program stored by a ROM (Read Only Memory) 202 to a RAM (Random Access Memory) 203, and executing the deployed program. The CPU 201 is connected to other units via a bus 200. The ROM 202 stores various information such as the control program and apparatus information. The RAM 203 is used as a temporary storage area such as a main memory, a work area, or the like, of the CPU 201. An HDD (Hard Disk Drive) 204 stores various data such as print data or a scan image.

Although it is assumed that, for the image forming apparatus 100, one CPU 201 executes the processing illustrated in the flowcharts described later, another configuration may be taken. For example, it is possible for a plurality of CPUs to cooperate so as to execute each process illustrated in the flowchart described later.

A Wi-Fi communication unit 205 executes wireless communication, which complies with an IEEE 802.11 series, between the image forming apparatus 100 and the mobile terminal 130. The wireless communication executed by the Wi-Fi communication unit 205 is directly executed with the mobile terminal 130 and does not go through a relay device such as an access point. A Bluetooth communication unit 213 executes wireless communication, which complies with Bluetooth Low Energy (Bluetooth LE), between the image forming apparatus 100 and the mobile terminal 130. In addition, the mobile terminal 130 can estimate the distance between the mobile terminal 130 and the image forming apparatus 100 in accordance with a radio field intensity of the wireless communication compliant with Bluetooth LE that the mobile terminal 130 receives.

A printer I/F 206 connects a printer (a printer engine) 207 with the bus 200. The printer 207 executes print processing based on, for example, image data generated by a scanner 209 or print data received from an external apparatus such as the PC 110 or the mobile terminal 130. A scanner I/F 208 connects the scanner 209 with the bus 200. The scanner 209 reads an original to generate image data. The image data generated by the scanner 209 is printed by the printer 207 or stored in the HDD 204. An operation unit interface 210 connects an operation unit 211 with the bus 200. The operation unit 211 is provided with a keyboard or a display unit that has a touch panel function, and displays various operation screens. A user can input information or an instruction to the image forming apparatus 100 via the operation unit 211. A network I/F 212 executes communication with a networked external apparatus that is connected to the network 120. The network I/F 212 receives print data transmitted from an external apparatus such as the PC 110 on the network 120, and print processing based on the received print data is executed by the printer 207.

Figure 3:
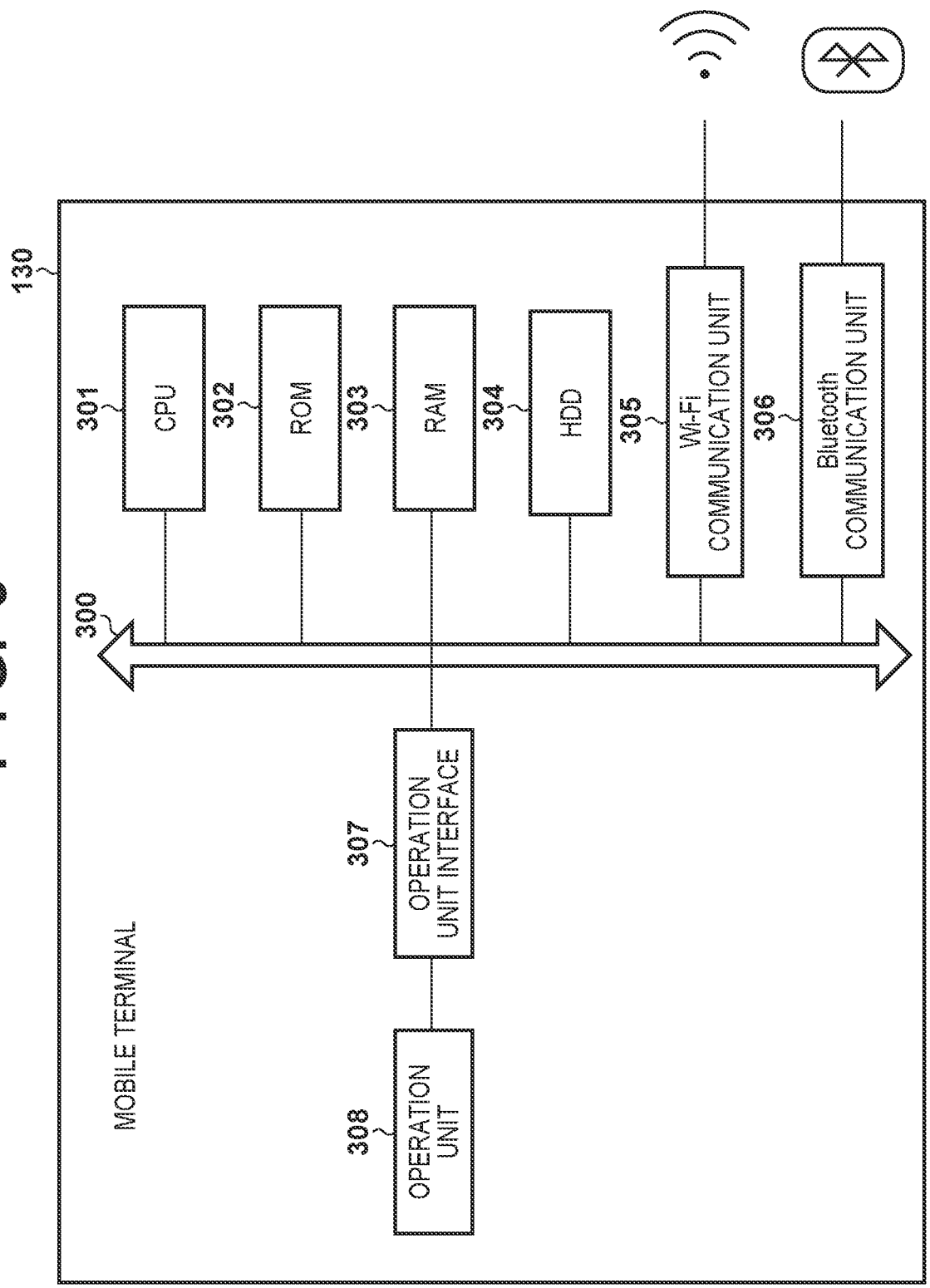
FIG. 3 is a block diagram for describing a hardware configuration of a mobile terminal according to the first embodiment.

FIG. 3 is a block diagram for describing a hardware configuration of the mobile terminal 130 according to the first embodiment.

A CPU 301 executes various processing for controlling operation of the mobile terminal 130 by deploying a control program stored by a ROM 302 to a RAM 303, and executing the deployed program. The CPU 301 is connected to other units via a bus 300. The ROM 302 stores the control program. The RAM 303 is used as a temporary storage area such as a main memory, a work area, or the like, of the CPU 301. An HDD 304 stores various data such as an image. A Wi-Fi communication unit 305 executes wireless communication with the image forming apparatus 100 and a terminal such as the mobile terminal. The wireless communication executed by the Wi-Fi communication unit 305 is directly executed with the image forming apparatus 100 and does not go through a relay device such as the access point 140. A Bluetooth communication unit 306 executes wireless communication between the image forming apparatus 100 and the mobile terminal 130. In addition, the mobile terminal 130 can estimate the distance between the mobile terminal 130 and the image forming apparatus 100 based on a radio field intensity of the wireless communication compliant with Bluetooth LE that the mobile terminal 130 receives. An operation unit interface 307 connects an operation unit 308 with the bus 300. The operation unit 308 is provided with a keyboard or a display unit that has a touch panel function, and displays various operation screens. A user can input information or an instruction to the mobile terminal 130 via the operation unit 308. It is assumed that the mobile terminal is installed with an application program for interoperating with the MFP 101 by using wireless communication compliant with Bluetooth LE or wireless communication compliant with IEEE 802.11. In addition, the application program is also stored in an application server whose illustration is omitted. A user of the mobile terminal 130 or the like can install an application program for interoperating with the MFP 101 by using a store application (illustration omitted) that is pre-installed on the mobile terminal 130.

FIG. 4 depicts a view illustrating an example of a table held by the mobile terminal 130 for the estimation of distance between the mobile terminal 130 and the image forming apparatus 100 in the first embodiment.

The mobile terminal 130 holds, in the ROM 302 or the like for example, in advance a table that indicates a relationship between distance and radio field intensity and is illustrated in FIG. 4. For example, if the intensity of a received wireless radio wave is 60 dBm, it is possible to estimate that the distance between the image forming apparatus 100 that emitted this radio wave and the mobile terminal 130 that received this radio wave is approximately 1 m. In a normal distance determination, because variation occurs in the radio field intensity due to, for example, reflection or radiation of the radio signals, determination of the distance is performed based on a plurality of radio field intensities rather than just one received radio signal. In addition, instead of performing a distance determination, it is possible to store radio field intensities in association with proximity levels (for example, "very immediate" indicating touching, "immediate" indicating approximately 30 cm, "near" indicating approximately 50 cm to 5 m, and far indicating more than 5 m).

FIGS. 5A and 5B depict views for describing an example of Bluetooth LE packets emitted from the image forming apparatus 100 according to the first embodiment.

In the wireless radio waves compliant with Bluetooth LE that are emitted from the image forming apparatus 100, there are advertising packets and communication packets after a Bluetooth LE connection is established. The Advertising Packet (advertise) contains various pieces of information such as a format type or a printer name. In addition, the mobile terminal 130 can detect a UUID for identifying a counterparty Bluetooth device based on received wireless radio waves compliant with Bluetooth LE. For example, a UUID is a Bluetooth device identifier typified by a Public Device Address or the like.

The mobile terminal 130 uses the UUID of the received radio waves to determine that they are being transmitted from the same device if the UUID is the same, even with an Advertising Packet of a different format. Here, illustration is given for an example where radio signals of two formats (Mobile app beacon and iBeacon for print) indicated by FIG. 5A and FIG. 5B are emitted from the same device, but radio signals of three or more formats may be emitted concurrently.

The "iBeacon for print" of FIG. 5B is a format for searching for a printer and is defined by Apple Inc. In addition, the "Mobile app beacon" of FIG. 5A is a format used by an application installed on the mobile terminal 130.

FIG. 6 depicts a view for describing an example in which radio signals of a plurality of formats that are emitted from the image forming apparatus 100 according to the first embodiment are time-divisionally emitted. FIG. 6 illustrates an example in which radio signals emitted from the image forming apparatus 100 are received by the mobile terminal 130, with time flowing from top to bottom.

Here, a radio signal of the format "Mobile app beacon" is emitted once at a 25 msec time interval, and a radio signal of the format "iBeacon for print" is emitted once at a 100 msec time interval. An example where these radio signals are switched once in 100 msec is illustrated.

The radio signal of the format "Mobile app beacon" is repeated emitted four times from the image forming apparatus 100, once every 25 msec, and next the radio signal of the format "iBeacon for print" is emitted once every 100 msec. Next, four emission of radio signals of the format "Mobile app beacon", and one emission of the radio signal of the format "iBeacon for print" are repeated. Illustration is given for an example where radio signals of two formats are emitted from the same device, but configuration may be taken to switch three or more formats at appropriate timings, so that the radio signal of each format is emitted at appropriate time intervals.

FIGS. 7A and 7B depict views for describing a decrease in sensitivity due to time-divisional transmission.

FIG. 7A depicts a view for describing distance estimation in a case where the image forming apparatus 100 transmits only a radio signal of the format "Mobile app beacon" with an emission time interval of 25 msec. Reference numeral 700 of FIG. 7A denotes an amount of time in which radio signals (20 radio signals) to be used for distance measurement are obtained. In the present embodiment, it is assumed that, in order to suppress error due to radio frequency interference or the like, a predetermined number of samples are obtained, and the distance estimation is performed based on these samples.

In contrast, FIG. 7B exemplifies a case where the image forming apparatus 100 is time-divisionally transmitting a radio signal of the format "Mobile app beacon" with an emission time interval of 25 msec, and a radio signal of the format "iBeacon for print" with an emission time interval of 100 msec. In addition, in a case where "iBeacon for print" is ignored in the situation of FIG. 7B and the distance is determined by obtaining only 20 radio signals for "Mobile app beacon", there is a concern that measurement accuracy of distance will decrease. Here, in consideration of the foregoing concern, using an Advertising Packet transmitted from a device of the same UUID, even in the case of a different format, for distance measurement is considered.

Reference numeral 701 of FIG. 7B denotes an amount of time in which radio signals (20 radio signals) to be used for distance measurement are obtained. In this case, it is possible to measure the distance by sampling in a shorter amount of time in comparison to the case where "iBeacon for print" is ignored in the situation of FIG. 7B and the distance is determined by obtaining only 20 radio signals for "Mobile app beacon". Consequently, it is possible to suppress a decrease of accuracy.

However, time required for measurement is longer in comparison to distance estimation in a case where the image forming apparatus 100 transmits only a radio signal of the format "Mobile app beacon" with an emission time interval of 25 msec which is denoted by reference numeral 700 of FIG. 7A. In other words, as illustrated by reference numeral 702 of FIG. 7B, radio field intensities obtained at an earlier time than in the case indicated by the reference numeral 700 of FIG. 7A are used to measure distance.

There is no problem if the distance between the image forming apparatus 100 and the mobile terminal 130 is the same (constant) during this period. However, if the mobile terminal 130 is moving, such as in a case where a user approaches the image forming apparatus 100 holding the mobile terminal 130, for example, a radio signal corresponding to old position information that does not correspond to current position information of the mobile terminal 130 will affect measurement of the distance, and distance measurement accuracy will decrease.

Figure 8:
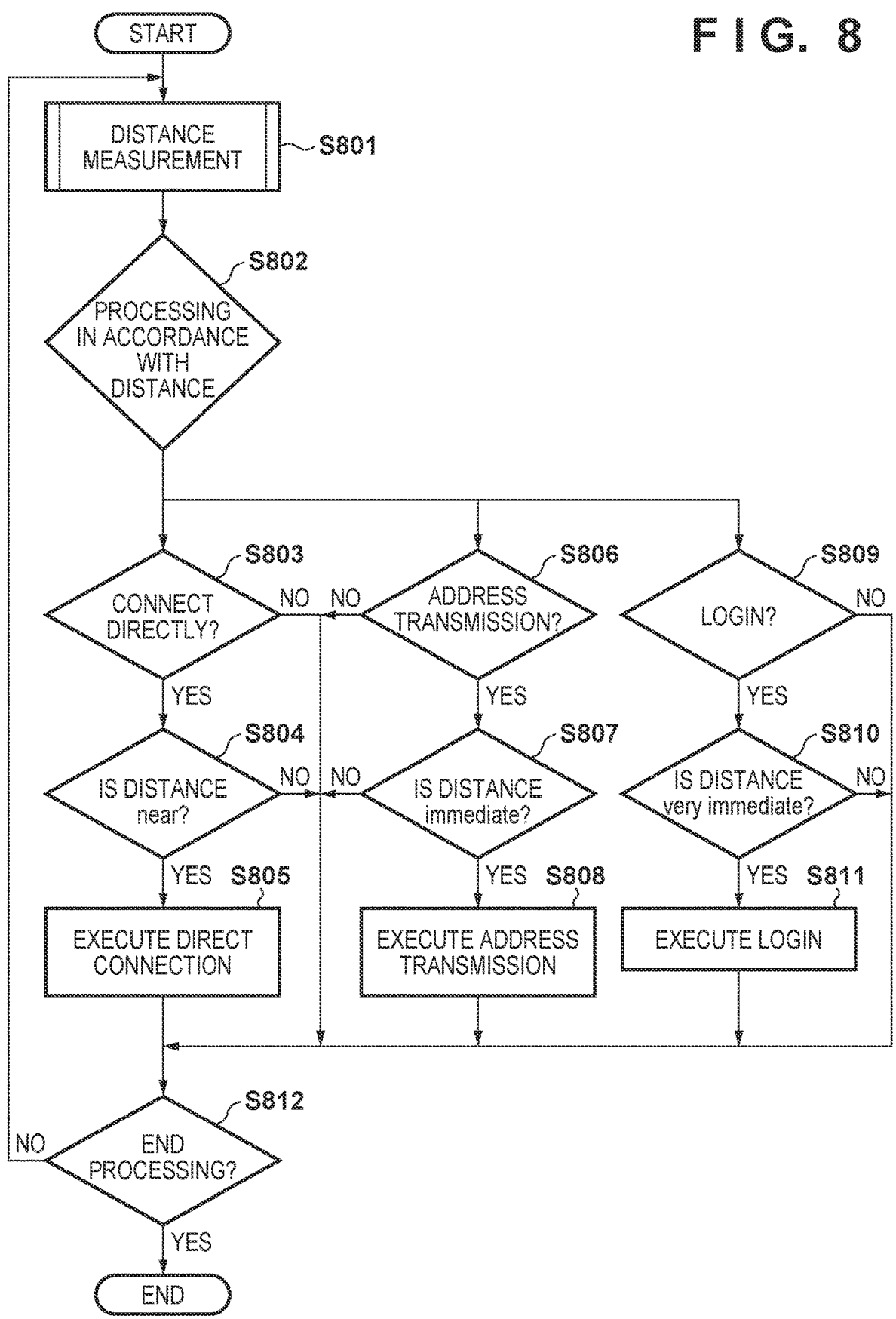

FIG. 8 is a flowchart for describing processing in which the mobile terminal 130 according to first through third embodiments measures (estimates) a distance to the image forming apparatus 100, and acts in accordance with the measured (estimated) distance. This processing is realized by the CPU 301 executing a program that has been deployed to the RAM 303. Note that this processing is executed in both of second and third embodiments described below. In addition, this program is an application having a function for operating the image forming apparatus 100 from the mobile terminal 130, and the image forming apparatus 100 which is an operation target is registered in the application as a precondition. As a method of registering, the image forming apparatus 100 is registered in the application of the mobile terminal 130 by the mobile terminal 130 and the image forming apparatus 100 connecting by wireless communication, and information of the image forming apparatus 100 being transferred to the mobile terminal 130. Here, the MAC address or the IP address of the image forming apparatus 100 is obtained from the image forming apparatus 100 and saved in the mobile terminal 130.

Firstly, in step S801, the CPU 301 measures (estimates) the distance between the image forming apparatus 100 and the mobile terminal 130. The details of this processing according to the first embodiment is described later with reference to the flowchart of FIG. 9. Next, the processing advances to step S802, and the CPU 301 determines which processing is selected, in accordance with the distance obtained by measurement.

In step S802, when the CPU 301 determines that the distance is where a direct connection, in which the image forming apparatus 100 and the mobile terminal 130 connect directly by Wi-Fi, should be started, the processing advances to step S803. In step S803, the CPU 301 determines whether or not an instruction to make a direct connection has been given, and if that is the case the processing advances to step S804, and otherwise the processing advances to step S812. In step S804, the CPU 301 determines whether or not the distance measured in step S801 is 50 cm to 5 m which corresponds to "near", and if so the processing advances to step S805, executes processing to directly connect to the image forming apparatus 100, and then advances to step S812. The processing for directly connecting establishes Bluetooth LE communication with the image forming apparatus 100, and performs the following processing. The CPU 301 establishes a direct connection with the image forming apparatus 100 by using a GATT (Generic Attribute Profile) communication to make a software AP activation instruction and performing processing for obtaining an SSID (Service Set Identifier) and a password. Meanwhile, when the CPU 301 determines in step S804 that the distance measured in step S801 does not correspond to "near", the processing advances to step S812.

In addition, when the CPU 301 determines in step S802 that there is a distance for which address transmission, in which an address held by the mobile terminal 130 is transmitted to the image forming apparatus 100, should be executed, the processing advances to step S806. In step S806, the CPU 301 determines whether or not address transmission for transmitting the held address to the image forming apparatus 100 has been selected, and if so the processing advances to step S807, and otherwise the processing advances to step S812. In step S807, the CPU 301 determines whether or not the distance measured in step S801 is approximately 30 cm which corresponds to "immediate", and if so the processing advances to step S808, executes processing to transmit an address, and then advances to step S812. In processing for transmitting the address, firstly the CPU 301 performs processing similar to the processing for directly connecting that is described above, and establishes a direct connection. Next, the CPU 301 transmits the held address to the image forming apparatus 100 by the established wireless communication. Note that the held address that is transmitted in step S808 is, for example, an e-mail address or a facsimile number, selected by a user operation in advance via an address book application or the like of the mobile terminal 130. Meanwhile, when the CPU 301 determines in step S807 that the distance measured in step S801 does not correspond to immediate, the processing advances to step S812.

In addition, when the CPU 301 determines in step S802 the distance for which to execute local login processing, which lets a user login to the image forming apparatus 100 based on user credential information held by the mobile terminal 130, the processing advances to step S809. In step S809, the CPU 301 determines whether or not processing for making a local login to the image forming apparatus 100 has been selected, and if that is the case the processing proceeds to step S810, and otherwise the processing advances to step S812. In step S810, the CPU 301 determines whether or not there is a touch operation where the distance measured in step S801 corresponds to "very immediate", and if so the processing advances to step S811, where processing to login to the image forming apparatus 100 is executed, and then the processing advances to step S812. Note that the local login processing is processing for causing the image forming apparatus to transition to a usable state that is performed via the operation unit of the image forming apparatus 100. The CPU 301 establishes a connection with the image forming apparatus 100, and transmits user credentials and a login request to the image forming apparatus 100 by a GATT communication. The image forming apparatus 100 authenticates the user based on the user credentials. When authentication succeeds, the image forming apparatus 100 enters a state where functions that can be used with the authority of the user who succeeded at the authentication can be used via the operation unit 211 of the image forming apparatus 100. Meanwhile, when it is determined in step S810 that there is no touch operation, the processing advances to step S812. In step S812, the CPU 301 determines whether or not processing that is performed in accordance with the distance between the mobile terminal 130 and the image forming apparatus 100 is to be continued, and when it is to be continued the processing proceeds to step S801, and the processing described above is executed. In contrast, when the processing is not to be continued, this processing ends.

Next, description is given for processing in which the mobile terminal 130 measures distance with the same sensitivity for when there is a single format, even if radio signals of a plurality of formats are transmitted from the image forming apparatus 100.

Figure 9:
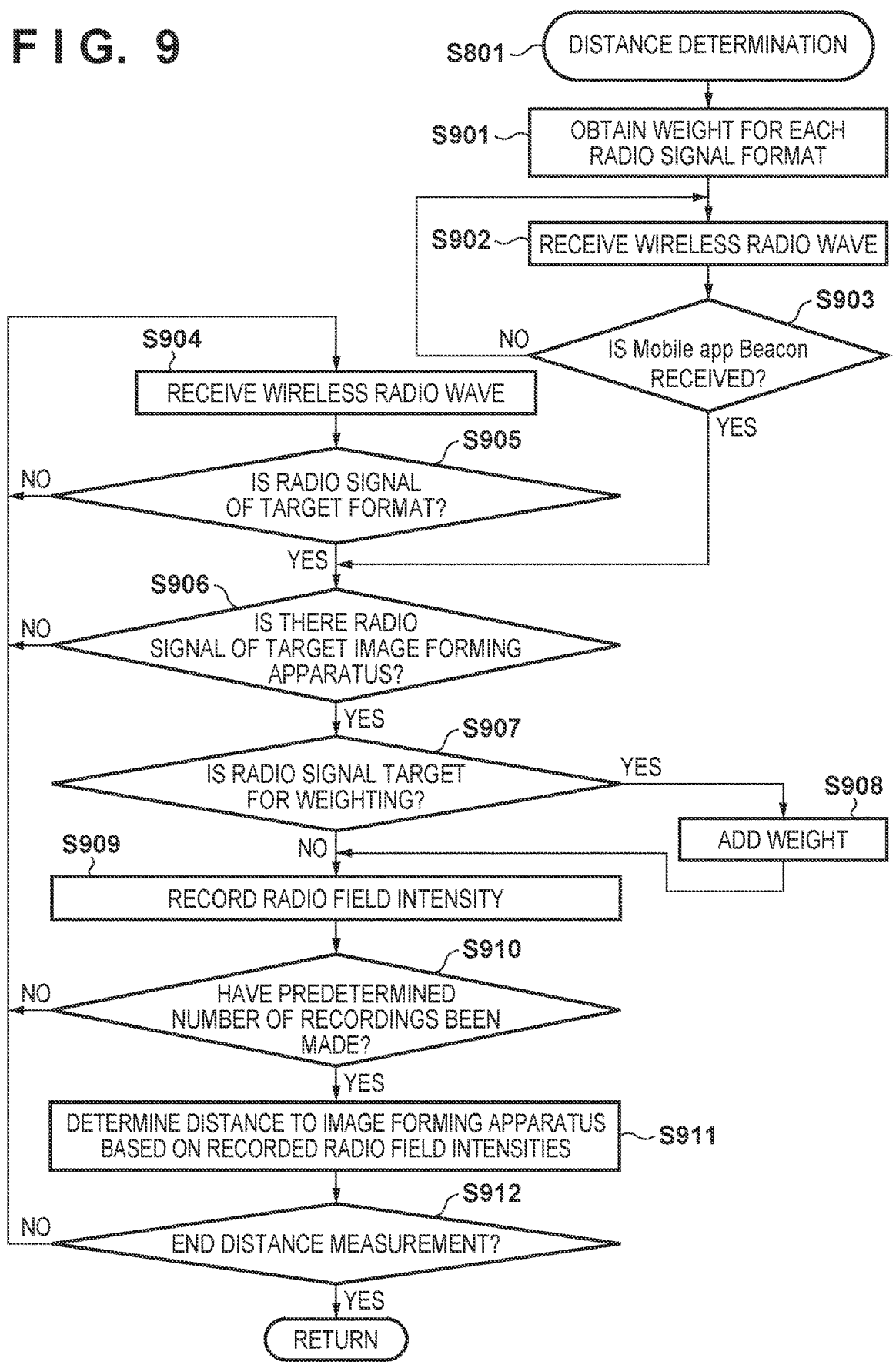
FIG. 9 is a flowchart for describing distance measurement processing of step S801 of FIG. 8 which is executed by the mobile terminal according to the first embodiment.

FIG. 9 is a flowchart for describing distance measurement processing of step S801 of FIG. 8 which is executed by the mobile terminal 130 according to the first embodiment. This processing is realized by the CPU 301 executing a program that has been deployed to the RAM 303.

In step S901, the CPU 301 obtains a weight for each radio signal format, and saves it in the RAM 303. Next, the processing proceeds to step S902, and the CPU 301 receives wireless radio waves by the Bluetooth wireless communication unit 306, and obtains the radio field intensity of the wireless radio waves. Information contained in the wireless radio waves is obtained and stored in the RAM 303. Next, the processing proceeds to step S903, and the CPU 301, based on the information contained in the wireless radio waves, identifies the format of the received radio signal, and determines whether or not it is a radio signal of the format "Mobile app beacon". If it is a radio signal of the format "Mobile app beacon", the processing proceeds to step S906, and otherwise the processing proceeds to step S902. The processing of step S902 and step S903 is repeatedly executed until a radio signal of the format "Mobile app beacon" is received.

In step S906, the CPU 301, based on the information contained in the wireless radio waves, determines whether or not the received radio signal is from a target image forming apparatus (an apparatus of interest), and if so the processing proceeds to step S907, and otherwise the processing proceeds to step S904. In step S904, the CPU 301 receives the wireless radio waves by the Bluetooth communication unit 306, and stores a radio field intensity thereof or information contained in the wireless radio waves in the RAM 303. The processing proceeds to step S905, and the CPU 301, based on the information contained in the wireless radio waves, identifies the format of the received radio signal, and determines whether or not the radio signal is of a target format, and if that is the case the processing proceeds to step S906, and otherwise the processing proceeds to step S904.

In step S907, the CPU 301, based on the information contained in the radio signal, determines whether or not the received radio signal is a target for adding a weight, and if so the processing proceeds to step S908, predetermined weighting is performed, and the processing proceeds to step S909. In contrast, when it is not a target radio signal for adding a weight in step S907, the processing proceeds to step S909. Details of this weighting are described later.

In step S909, the CPU 301 stores the radio field intensity of the received wireless radio waves in the RAM 303. The processing advances to step S910, and the CPU 301 determines whether or not a predetermined number (for example, 20) radio field intensities necessary to measure the distance to the image forming apparatus 100 have been obtained and stored, and if so the processing proceeds to step S911, and otherwise the processing proceeds to step S904. In step S911, the CPU 301 determines the distance to the image forming apparatus 100 based on the stored predetermined number of radio field intensities of the wireless radio waves. For example, the distance to the image forming apparatus 100 is determined (estimated) based on an average value, a median value, or a maximum value of the stored predetermined number of radio field intensities of the wireless radio waves. The processing advances to step S912, and the CPU 301 determines whether or not the distance measurement processing has ended, and when it is determined that it has ended this processing ends, and otherwise the processing proceeds to step S904.

In this way, the mobile terminal 130 can measure the distance to the image forming apparatus 100 based on the radio field intensities of Bluetooth LE signals received from the image forming apparatus 100.

Note that, if it is determined here that the mobile terminal 130 and the image forming apparatus 100 are within a predetermined distance, the mobile terminal 130 and the image forming apparatus 100 perform bi-directional wireless communication. Performing various processing such as login to a local UI of the image forming apparatus 100, a handover to Wi-Fi, or output of print data held in the image forming apparatus 100, for example, thus becomes possible.

FIG. 10 depicts a view illustrating an example of weightings added in step S908 of FIG. 9.

As described above, there are a plurality of radio signal formats for a Bluetooth LE beacon, and it is possible to change the interval of emission of a radio signal in accordance with its format. For example, the emission interval of radio signals of the format "Mobile app beacon" is 25 msec, whereas the emission interval of radio signals of the format "iBeacon for print" is 4 times as long at 100 msec. In accordance with, in measuring distance using radio signals of a plurality of formats, the weight for a radio signal of the format "iBeacon for print" is set to 4 (quadruple) of the radio signal of the format "Mobile app beacon". For example, if one radio signal of the format "Mobile app beacon" is received, it is recorded as one radio field intensity. For example, if one radio signal of the format "iBeacon for print" is received, it is recorded as radio field intensities for four radio signals. Similarly, for a weight of another format, a value obtained by dividing the emission interval of another format by the emission interval of a radio signal of the format "Mobile app beacon" is applied.

By virtue of the first embodiment as described above, even when radio signals of a plurality of radio signal formats are used, it is possible to measure distance with sensitivity comparable to the case of measuring distance by using radio signals of a single format.

Second Embodiment

In the first embodiment, description was given of an example where measurement of distance is performed with sensitivity similar to the case of radio signals of a single format, even in a case where radio signals of a plurality of formats are received from an image forming apparatus. In contrast to this, in the second embodiment, description is given by an example of deciding a weight in accordance with a reception time interval for radio signals. Note that, because a configuration of the communication system and a hardware configuration of the image forming apparatus 100 and the mobile terminal 130 according to the second embodiment are the same as the case of the first embodiment described above, description thereof is omitted.

Figure 11:
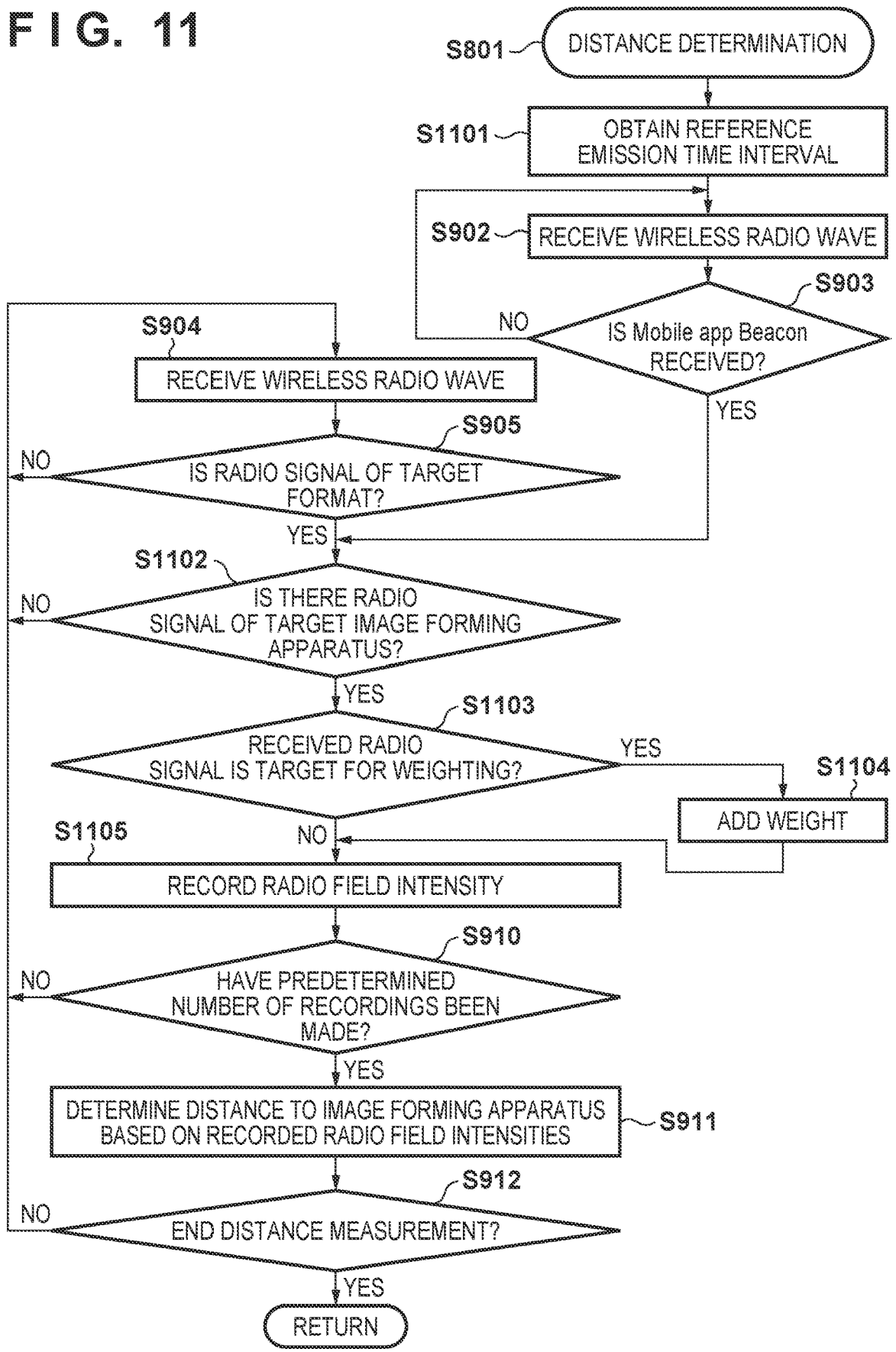
FIG. 11 is a flowchart for describing distance measurement processing of step S801 of FIG. 8 which is executed by the mobile terminal according to a second embodiment.

FIG. 11 is a flowchart for describing distance measurement processing of step S901 of FIG. 9 which is executed by the mobile terminal 130 according to the second embodiment. This processing is realized by the CPU 301 executing a program that has been deployed to the RAM 303. Note that the same reference numerals are added to steps that have the same processing as those in FIG. 9 described above, and description thereof is omitted.

Firstly, in step S1101, the CPU 301 obtains an emission time interval based on radio signals emitted from the image forming apparatus 100 (for example, 25 msec), and stores it in the RAM 303. Next, the processing proceeds to step S902, and the CPU 301 receives a wireless radio wave, obtains a radio field intensity thereof or information contained in the radio signal, and stores this in the RAM 303. In step S903, the CPU 301 determines, in accordance with the information contained in the radio signal, whether or not the received radio signal is a radio signal of the format "Mobile app beacon". If the received radio signal is of the format "Mobile app beacon", the processing proceeds to step S1102, and the CPU 301 determines whether or not the received radio signal is a radio signal from a target image forming apparatus, in accordance with information contained in the received radio signal. If the received radio signal is from the target image forming apparatus, the processing proceeds to step S1103, and the CPU 301 determines whether or not the received radio signal is a target for weighting, based on the information contained in the radio signal. If the received radio signal is a target for weighting, the processing proceeds to step S1104, and the CPU 301 performs weighting based on a reference radio signal emission time interval and the emission time interval of the radio signal that is currently received, and then the processing proceeds to step S1105. In step S1105, the CPU 301 stores the radio field intensity of the received radio signal in the RAM 303.

In step S1105, for example, if the received radio signal is of the format "Mobile app beacon" which has an emission time interval of 25 msec, this is recorded as one radio field intensity. In contrast, for example, if a radio signal whose emission time interval is 200 msec is received, its weight becomes "8", and 8 radio field intensities are recorded for the received radio signal in step S1105.

By virtue of the second embodiment as described above, even when radio signals of a plurality of formats are emitted from the image forming apparatus 100, a weight for radio field intensity is decided based on reception time intervals for the radio signals and a reference emission time interval. By this, it is possible to measure distance with the same sensitivity as in the case where distance is obtained by receiving radio signals of a single format.

In the second embodiment as well, when it is determined that the distance between the mobile terminal 130 and the image forming apparatus 100 is less than or equal to a predetermined value, the mobile terminal 130 and the image forming apparatus 100 perform bidirectional communication, and, for example, the mobile terminal 130 can login to a local UI of the image forming apparatus 100. In addition, it becomes possible to perform various processing, such as a handover to Wi-Fi or output of held print data to the image forming apparatus 100.

Third Embodiment

Next, description will be given for a third embodiment of the present invention. In the third embodiment, description is given for an example in which distance is determined based on the radio field intensities of radio signals that can be received in a predetermined amount of time, instead of weighting each radio signal format. Note that, because a configuration of the communication system and a hardware configuration of the image forming apparatus 100 and the mobile terminal 130 according to the third embodiment are the same as the case of the first embodiment described above, description thereof is omitted.

Figure 12:
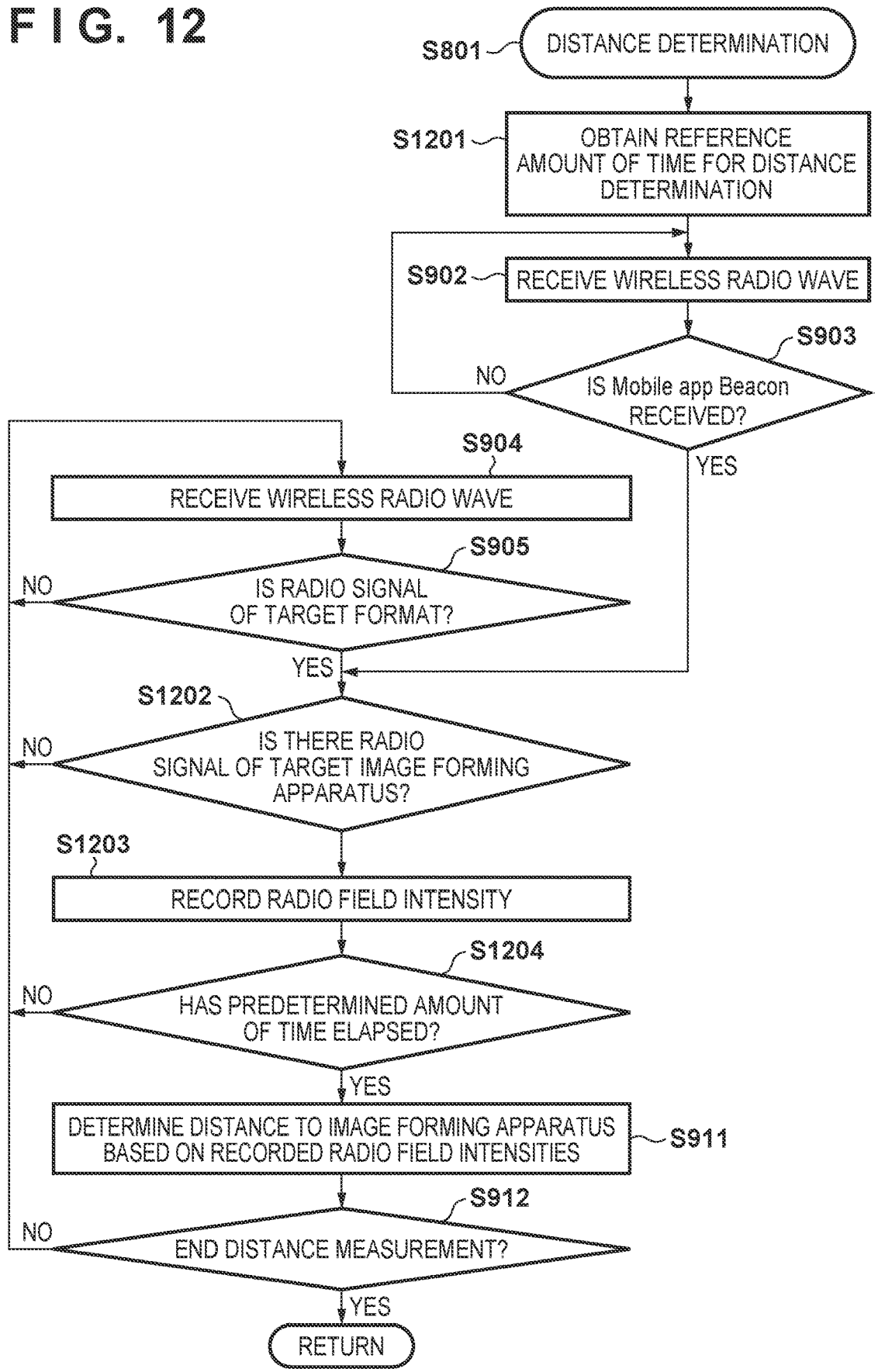
FIG. 12 is a flowchart for describing distance measurement processing of step S801 of FIG. 8 which is executed by the mobile terminal according to a third embodiment.

FIG. 12 is a flowchart for describing distance measurement processing of step S901 of FIG. 9 which is executed by the mobile terminal 130 according to the third embodiment. This processing is realized by the CPU 301 executing a program that has been deployed to the RAM 303. Note that the same reference numerals are added to steps that have the same processing as those in FIG. 9 described above, and description thereof is omitted.

Firstly, in step S1201, the CPU 301 obtains an amount of time period that is a reference for distance determination, and saves it in the RAM 303. In step S902 through step S903 the CPU 301 receives a radio signal, records a radio field intensity thereof or information contained in a wireless radio wave in the RAM 303, and if the format of the radio signal is "Mobile app beacon", the processing proceeds to step S1202.

In step S1202, the CPU 301 determines whether or not the received radio signal is from a target image forming apparatus, and if that is the case the processing proceeds to step S1203, and the CPU 301 records the radio field intensity of the received wireless radio wave in the RAM 303. Next, the processing proceeds to step S1204, and the CPU 301 determines whether or not a predetermined amount of time period for performing a distance determination has elapsed, and if that is the case the processing proceeds to step S911, and the distance to the image forming apparatus 100 is determined based on the radio field intensity of the received radio signals.

By virtue of the third embodiment in this fashion, it is possible to measure the distance to the image forming apparatus 100 based on radio field intensities that can be received in a predetermined amount of time, even if radio signals of a plurality of formats (types) transmitted from the image forming apparatus 100 which is a transmission source. By this, it is possible to measure distance by similar sensitivity to the case where there is a single format for radio signals transmitted from the image forming apparatus 100.

In the third embodiment as well, when it is determined that the distance between the mobile terminal 130 and the image forming apparatus 100 is less than or equal to a predetermined value, the mobile terminal 130 and the image forming apparatus 100 perform bidirectional communication, and, for example, the mobile terminal 130 can login to a local UI of the image forming apparatus 100. In addition, it becomes possible to perform various processing, such as a handover to Wi-Fi or output of held print data to the image forming apparatus 100.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-000770, filed Jan. 5, 2018, which is hereby incorporated by reference herein in its entirety.

What is claimed is:

1. An information processing apparatus operable to perform communication in accordance with a predetermined communication standard, the information processing apparatus comprising:
   a memory device that stores a program; and
   at least one processor that executes the program stored in the memory to:
   receive wirelessly and directly, from a device, advertising packets of a plurality of different formats that comply with the predetermined communication standard and are transmitted from the device; and
   estimate a proximity level between the device having transmitted the advertising packets and the information processing apparatus by sampling radio field intensities of the advertising packets of the plurality of different formats,
   wherein the advertising packets include at least a first advertising packet of a first format and a second advertising packet of a second format, wherein a number of sampling of the radio field intensities of the first advertising packet is less than a number of sampling of the radio field intensities of the second advertising packet per unit of time, and
   wherein a sampled radio field intensity of the first advertising packet influences the estimate more than a sampled radio field intensity of the second advertising packet.

2. The information processing apparatus according to claim 1, wherein, in the reception, each of the advertising packets of the plurality of different formats transmitted from the same device is received at a different timing, and, in the estimation, the radio field intensities of the received advertising packets of the plurality of different formats received at the different timings are used to estimate the proximity level.

3. The information processing apparatus according to claim 1, wherein each of the advertising packets of the plurality of different formats is transmitted from the device in a different time interval.

4. The information processing apparatus according to claim 1, wherein the advertising packets have a different transmission interval for each format.

5. The information processing apparatus according to claim 1, wherein each of the advertising packets of the plurality of different formats contains common identification information as identification information indicating the device having transmitted the advertising packets, and contains a format classification as information indicating a format.

6. The information processing apparatus according to claim 1, wherein, in the estimation, the proximity level between the device and the information processing apparatus is estimated based on information obtained by sampling, for a predetermined number of times, the radio field intensities of the advertising packets of the plurality of different formats.

7. The information processing apparatus according to claim 1, wherein the at least one processor executes the instructions to further:
   identify formats of the received advertising packets,
   wherein, in the estimation, weighting for a sampling is caused to differ in accordance with the identified formats.

8. The information processing apparatus according to claim 7, wherein the weighting is in accordance with an interval of radio wave emission.

9. The information processing apparatus according to claim 1, wherein, in the estimation, the proximity level between the device having transmitted the advertising packets and the information processing apparatus is estimated based on the radio field intensities of the advertising packets of the plurality of different formats which are sampled in a duration during which a predetermined amount of time elapses.

10. The information processing apparatus according to claim 1, wherein the at least one processor executes the instructions to further:
    cause the device to execute a first process if the estimated proximity level satisfies a first condition, and causes the device to execute a second process different to the first process if the proximity level satisfies a second condition different to the first condition.

11. The information processing apparatus according to claim 1, wherein the predetermined communication standard is Bluetooth LE (Low Energy).

12. The information processing apparatus according to claim 1, wherein the advertising packets include an identical Universally Unique Identifier (UUID), respectively.

13. The information processing apparatus according to claim 1, wherein each of the radio field intensities of the received advertising packets of the plurality of different formats vary in accordance with a distance between the device and the information processing apparatus.

14. A method of controlling an information processing apparatus operable to perform communication in accordance with a predetermined communication standard, the method comprising:
    receiving wirelessly and directly, from a device, advertising packets of a plurality of different formats that comply with the predetermined communication standard and are transmitted from the device; and
    estimating a proximity level between the device having transmitted the advertising packets and the information processing apparatus by sampling radio field intensities of the advertising packets of the plurality of different formats, wherein the advertising packets include at least a first advertising packet of a first format and a second advertising packet of a second format, wherein a number of sampling of the radio field intensities of the first advertising packet is less than a number of sampling of the radio field intensities of the second advertising packet per unit of time, and wherein a sampled radio field intensity of the first advertising packet influences the estimate more than a sampled radio field intensity of the second advertising packet.

15. The method according to claim 14, wherein, in the receiving, each of the advertising packets of the plurality of different formats transmitted from the device is received at a different timing, and, in the estimating, the radio field intensities of the received advertising packets of the plurality of different formats received at the different timings are used to estimate the proximity level.

16. The method according to claim 14, wherein each of the advertising packets of the plurality of different formats is transmitted from the device in a different time interval.

17. The method according to claim 14, wherein the advertising packets have a different transmission interval for each format.

18. The method according to claim 14, wherein each of the advertising packets of the plurality of different formats contains common identification information as identification information indicating the device having transmitted the advertising packets, and contains a format classification as information indicating a format.

19. The method according to claim 14, wherein, in the estimating, the proximity level between the device having transmitted the advertising packets and the information processing apparatus is estimated based on information obtained by sampling, for a predetermined number of times, the radio field intensities of the advertising packets of the plurality of different formats.

20. A non-transitory computer-readable storage medium storing a program for causing a processor to execute a method of controlling an information processing apparatus operable to perform communication in accordance with a predetermined communication standard, the method comprising:

receiving wirelessly and directly, from a device, advertising packets of a plurality of different formats that comply with the predetermined communication standard and are transmitted from the device; and estimating a proximity level between the device having transmitted the advertising packets and the information processing apparatus by sampling radio field intensities of the advertising packets of the plurality of different formats, wherein the advertising packets include at least a first advertising packet of a first format and a second advertising packet of a second format, wherein a number of sampling of the radio field intensities of the first advertising packet is less than a number of sampling of the radio field intensities of the second advertising packet per unit of time, and wherein a sampled radio field intensity of the first advertising packet influences the estimate more than a sampled radio field intensity of the second advertising packet.

* * * * *